(12) United States Patent
Chen et al.

(10) Patent No.: US 10,905,280 B2
(45) Date of Patent: Feb. 2, 2021

(54) GRILL DEVICE WITH A TEMPERATURE SENSING PROBE

(71) Applicant: Tsann Kuen (Zhangzhou) Enterprise Co., Ltd., Fujian (CN)

(72) Inventors: Dongmei Chen, Fujian (CN); Yixin Zhan, Fujian (CN); Haiping Zhang, Fujian (CN)

(73) Assignee: Tsann Kuen (Zhangzhou) Enterprise Co., Ltd., Fujian (CN)

( * ) Notice: Subject to any disclaimer, the term of this patent is extended or adjusted under 35 U.S.C. 154(b) by 697 days.

(21) Appl. No.: 15/656,464

(22) Filed: Jul. 21, 2017

(65) Prior Publication Data
US 2018/0020872 A1 Jan. 25, 2018

(30) Foreign Application Priority Data

Jul. 25, 2016 (CN) .......................... 2016 1 0589919

(51) Int. Cl.
*A47J 37/06* (2006.01)
*A47J 37/07* (2006.01)

(52) U.S. Cl.
CPC ....... *A47J 37/0611* (2013.01); *A47J 37/0786* (2013.01)

(58) Field of Classification Search
CPC .................................................. A47J 37/0611
USPC ......................................................... 99/372
See application file for complete search history.

(56) References Cited

U.S. PATENT DOCUMENTS

| 5,712,466 | A | * | 1/1998 | Spicer ................. | A47J 37/0611 |
| | | | | | 219/445.1 |
| 5,992,302 | A | * | 11/1999 | Geisler .................. | A47J 36/32 |
| | | | | | 99/343 |
| 6,595,115 | B1 | | 7/2003 | Lin | |
| 6,615,706 | B1 | * | 9/2003 | Wu ....................... | A47J 37/0611 |
| | | | | | 99/331 |
| 2011/0062141 | A1 | | 3/2011 | Addesso et al. | |
| 2011/0305810 | A1 | * | 12/2011 | Owensby ............. | A47J 37/0611 |
| | | | | | 426/523 |
| 2015/0037472 | A1 | * | 2/2015 | Fung ..................... | A47J 37/0611 |
| | | | | | 426/231 |
| 2015/0037482 | A1 | * | 2/2015 | Fung ..................... | A47J 37/0611 |
| | | | | | 426/523 |

FOREIGN PATENT DOCUMENTS

GB 2397157 A 7/2004

* cited by examiner

*Primary Examiner* — Ibrahime A Abraham
*Assistant Examiner* — John J Norton
(74) *Attorney, Agent, or Firm* — Muncy, Geissler, Olds & Lowe, P.C.

(57) ABSTRACT

A grill device includes a first grill module movably connected to a second grill module to be movable between a closed position, where the first and second grill modules define a grill space therebetween for accommodating a food to be grilled, and an opened position. The first grill module includes a first housing having a first grill plate that has a penetrating hole, a sensing mechanism having a probe assembly that is movably mounted on the first housing and that has a probe, and a control mechanism which is disposed to actuate movement of the probe assembly between a projecting position, where a tip end of the probe extends into the grill space through the penetrating hole, and a retreating position, where the tip end retreats into the penetrating hole.

9 Claims, 18 Drawing Sheets

GRILL DEVICE WITH A TEMPERATURE SENSING PROBE

CROSS-REFERENCE TO RELATED APPLICATION

This application claims priority of Chinese Patent Application No. 201610589919.8, filed on Jul. 25, 2016.

FIELD

The disclosure relates to a grill device, and more particularly to a grill device with a probe for sensing a temperature of food.

BACKGROUND

A conventional grill device for a thick food, such as a beef steak, chicken, a pork chop, etc., generally includes two grill bodies pivotably connected to each other to define a grill space therebetween in a closed position when overlapped with each other. A probe is mounted on one of the grill bodies to be inserted into a food in the grill space so as to sense the grill condition of the food.

Such probe is securely mounted to be kept projecting for being inserted into a food when the grill device is in the closed position, and may prick the user when the grill device is in an opened position.

SUMMARY

Therefore, an object of the disclosure is to provide a grill device which can be used safely to sense a temperature of a food to be grilled.

According to the disclosure, the grill device includes a first grill module and a second grill module. The first grill module includes a first housing which has a first grill plate, and a sensing mechanism which is mounted on the first housing. The first grill plate has a penetrating hole. The second grill module is movably connected to the first grill module such that the first grill module is movable between a closed position, where the first grill module is overlapped with the second grill module to define a grill space therebetween for accommodating a food to be grilled and the first grill plate faces the grill space, and an opened position. The sensing mechanism has a probe assembly which is movably mounted on the first housing and which has a probe. The first grill module further includes a control mechanism which is disposed to actuate movement of the probe assembly relative to the first housing in a probe moving direction between a projecting position, where a tip end of the probe extends into the grill space through the penetrating hole, and a retreating position, where the tip end of the probe retreats into the penetrating hole.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
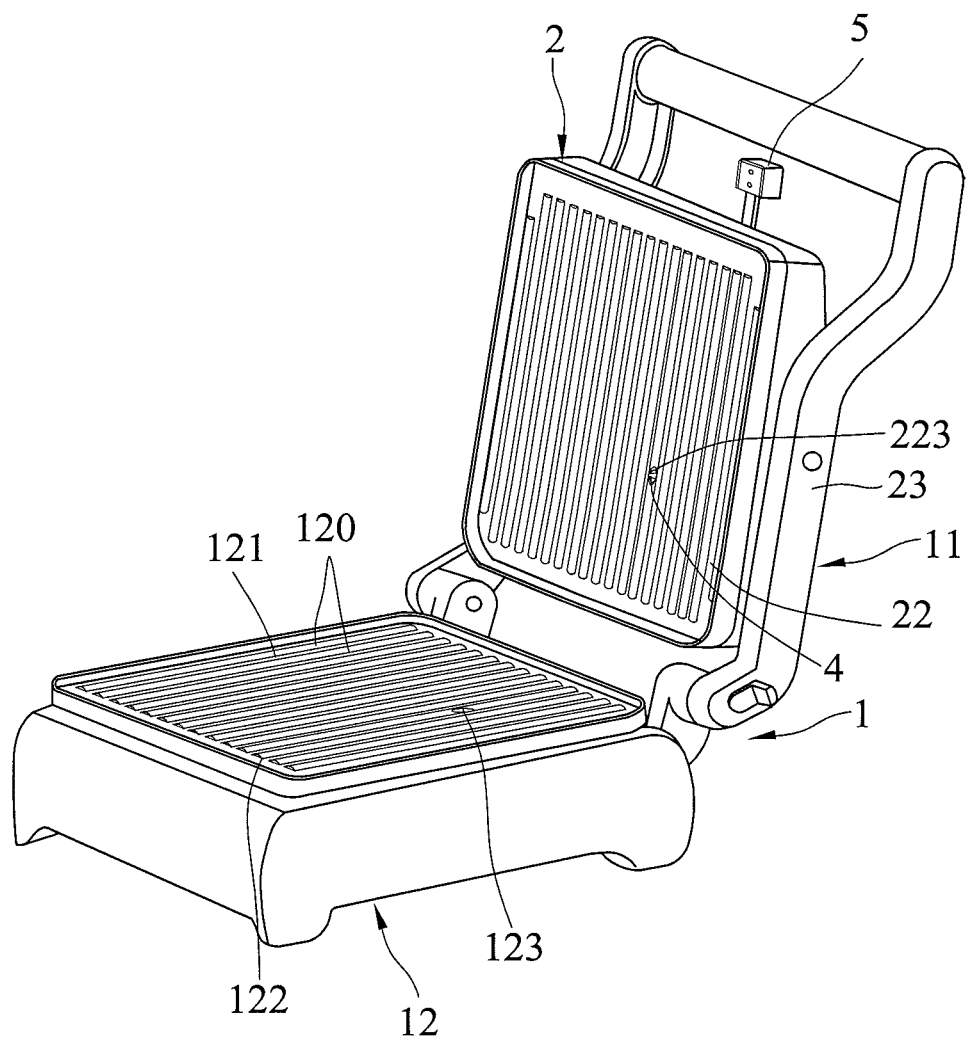
FIG. 1 is a perspective view illustrating a state where a first embodiment of a grill device according to the disclosure is in an opened position.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
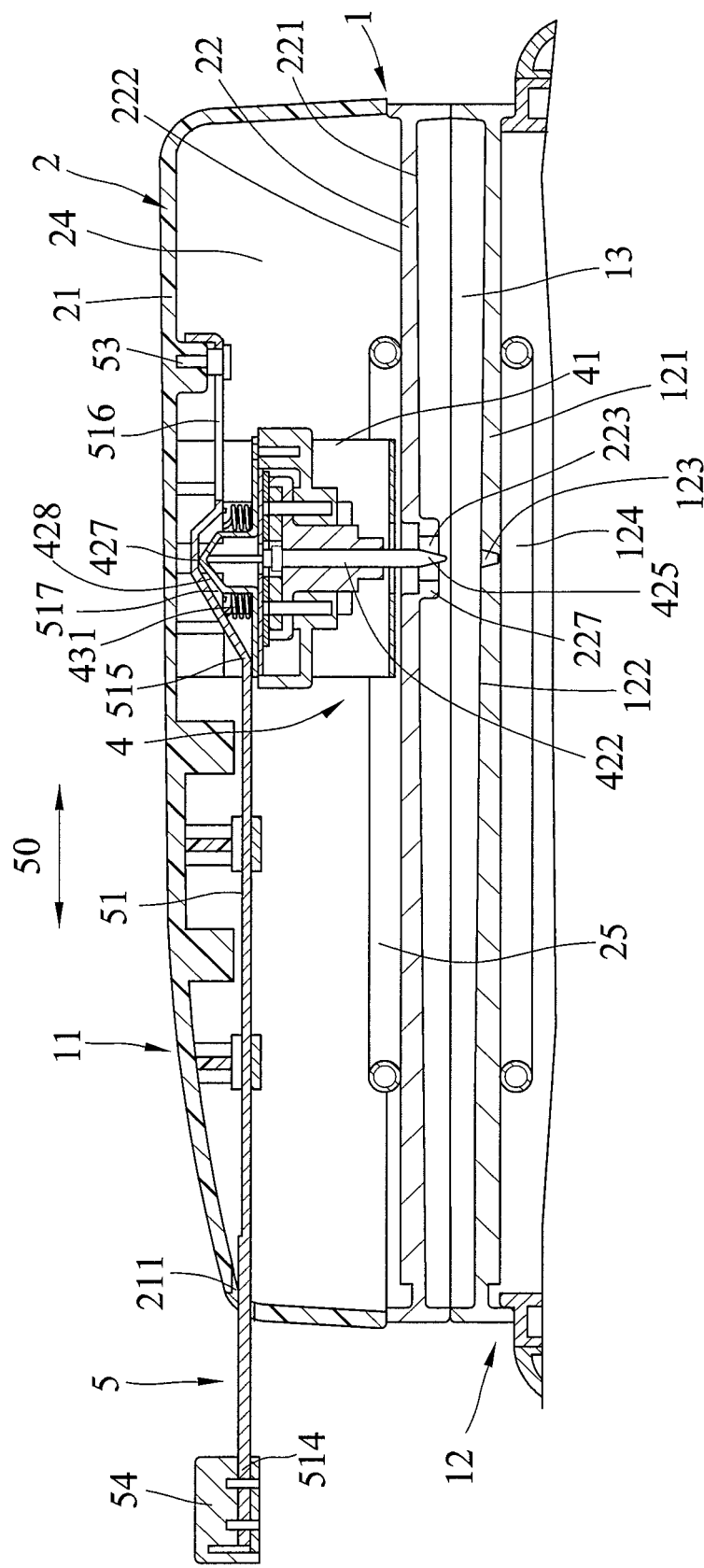
FIG. 2 is a fragmentary sectional view illustrating a state where the grill device of the first embodiment is in a closed position, and a probe assembly is in a retreating position.
Figure 3:
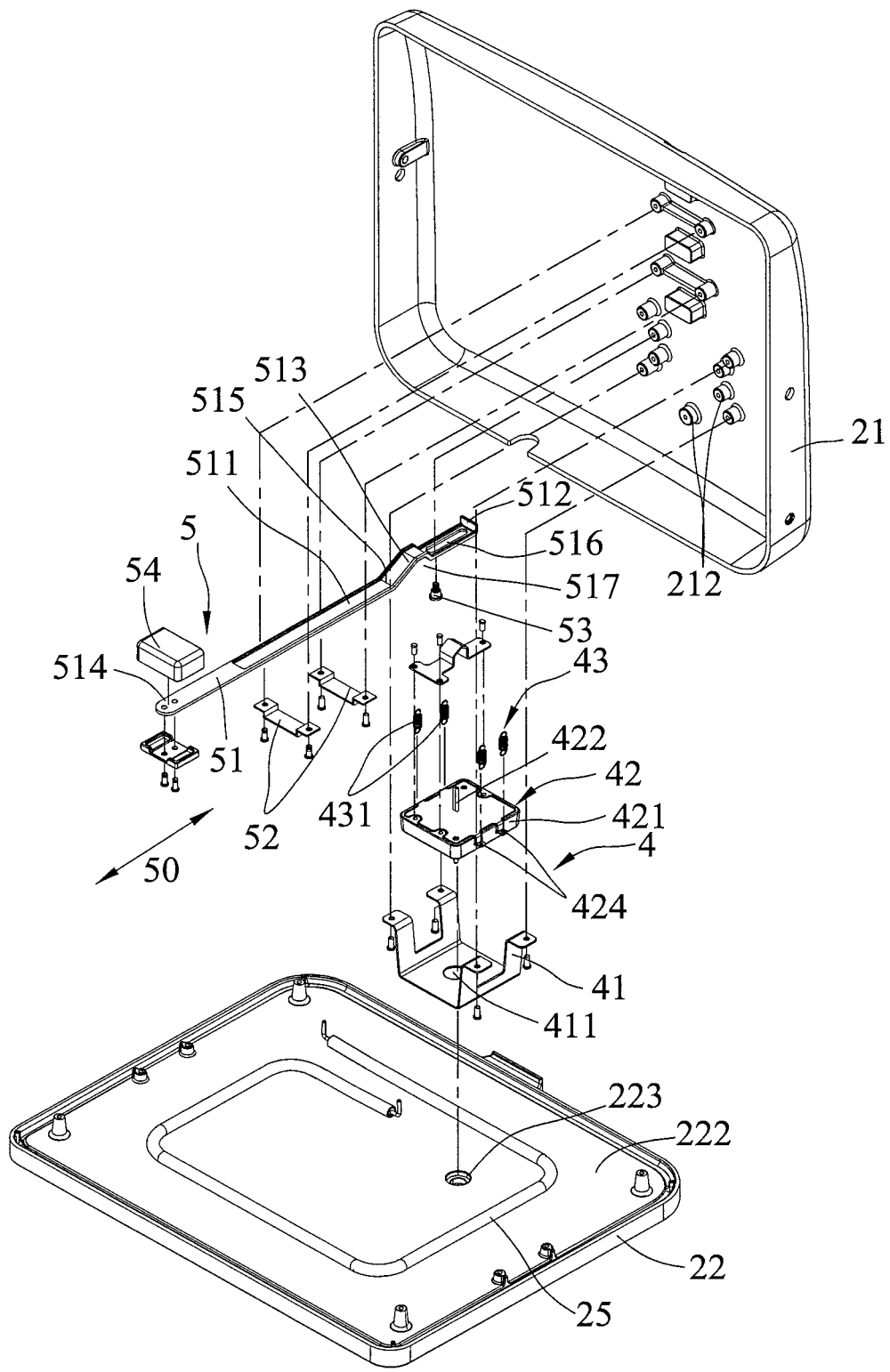
FIG. 3 is an exploded perspective view of a first grill module of the grill device.
Figure 4:
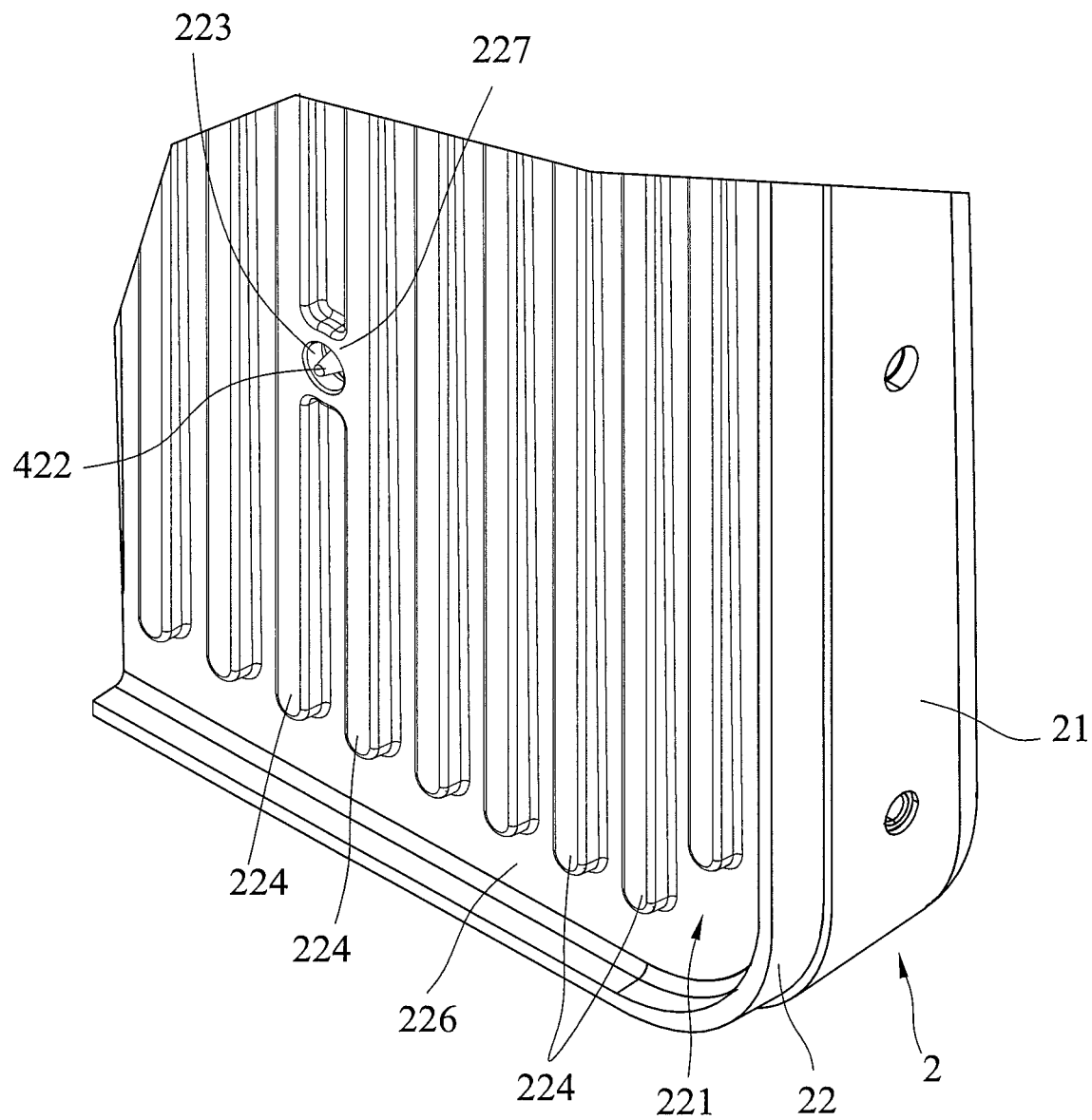
FIG. 4 is a fragmentary perspective view of a first grill plate of the grill device.
Figure 5:
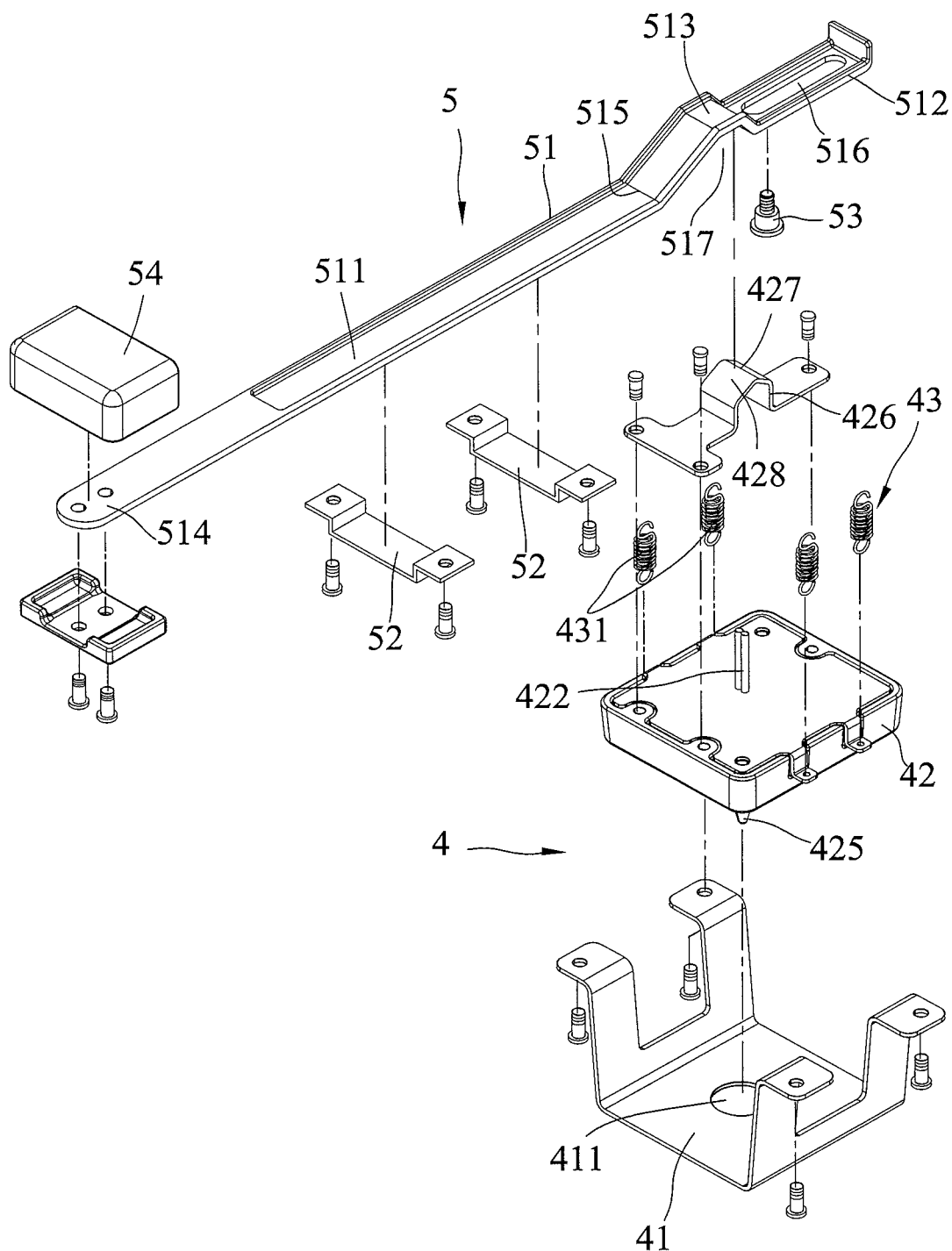
FIG. 5 is an exploded perspective view illustrating a sensing mechanism and a control mechanism of the first grill module.
Figure 6:
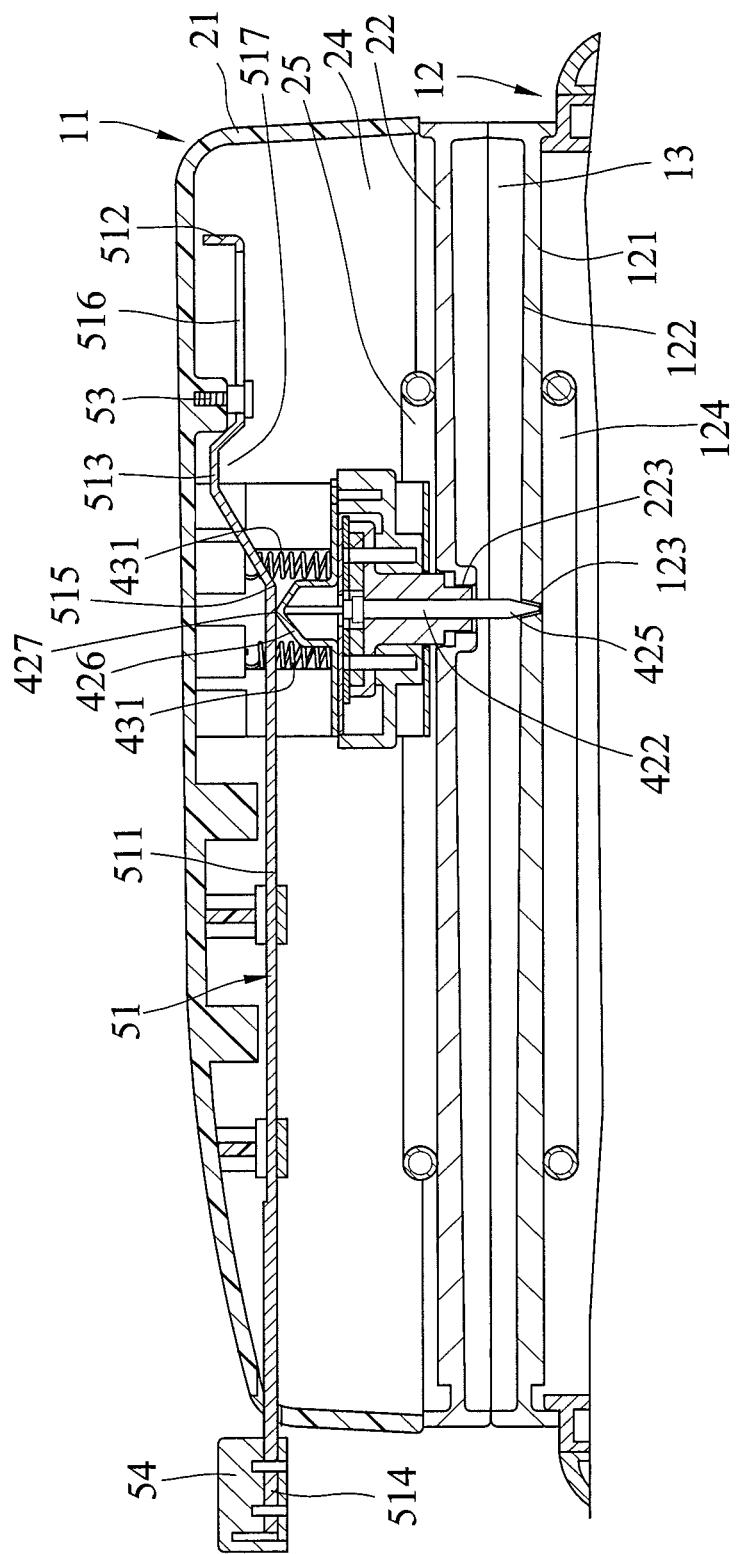
FIG. 6 is a fragmentary sectional view illustrating a state where the probe assembly is in a projecting position.

Referring to FIGS. 1 to 3, a first embodiment of a grill device 1 according to the disclosure is adapted to grill a thick food, such as a beef steak, chicken, a pork chop, etc. The grill device 1 includes a first grill module 11 and a second grill module 12 pivotably connected to the first grill module 11 such that the first grill module 11 is movable between a closed position (see FIG. 2), where the first grill module 11 is overlapped with the second grill module 12 to define a grill space 13 therebetween for accommodating a food to be grilled, and an opened position (see FIG. 1). The second grill module 12 is generally placed on a tabletop for placement of the food. The first grill module 11 includes a first housing 2, and a sensing mechanism 4 and a control mechanism 5 which are mounted within the first housing 2.

With reference to FIGS. 2 to 5, the first housing 2 has a housing shell 21, a first grill plate 22 which is connected to the housing shell 21, and a handle 23 which is securely connected to the housing shell 21 and through which the housing shell 21 is pivotably mounted to the second grill module 12. The housing shell 21 and the first grill plate 22 cooperatively define an accommodation space 24. The housing shell 21 has an opening 211 adjacent to a side edge thereof, and a plurality of spring holders 212 which extend toward the first grill plate 22. The first grill plate 22 has a first grill surface 221 which faces the grill space 13 in the closed position, an inner surface 222 opposite to the first grill surface 221, and a penetrating hole 223 which extends through the first grill surface 221 and the inner surface 222. The first grill surface 221 has a base surface portion 226 and a plurality of rib portions 224 which are spaced apart from each other and which extend from the base surface portion 226 to press the food in the grill space 13. One of the rib portions 224 has a transverse section 227 which extends to engage an adjacent one of the rib portions 224. The penetrating hole 223 is formed in and extends through the transverse section 227. The first housing 2 has a heating member 25 which is mounted in the accommodation space 24 and adjacent to the inner surface 222 of the first grill plate 22.

The sensing mechanism 4 has a frame 41 which is suspended on the housing shell 21, a probe assembly 42 which is supported and movably guided by the frame 41 to move relative to the housing shell 21, and a biasing member 43 which is mounted between the probe assembly 42 and the housing shell 21. The frame 41 has a through hole 411 which is aligned with the penetrating hole 223 of the first grill plate 22 in a probe moving direction. The probe assembly 42 has a probe housing 421 and a probe 422 which is received in the probe housing 421 and which has a tip end 425 that extends through the probe housing 421 and the through hole 411. The probe housing 421 has a plurality of lugs 424 which are disposed on side walls thereof and which are aligned with the spring holders 212, respectively, in the probe moving direction, and a protrusion 426 which projects in the probe moving direction toward the housing shell 21. The protrusion 426 has a ridge 427 and a slope 428 which is inclined from the ridge 427 toward the opening 211. The probe 422 can be used to sense the temperature of the food, and has the tip end 425 which projects through the through hole 411 to be inserted into the food. The biasing member 43 has a plurality of springs 431 each of which has two ends that anchor a respective one of the lugs 424 and a respective one of the spring holders 212 to bias the probe assembly 42 to a retreating position, where the tip end 425 of the probe 422 retreats into the penetrating hole 223.

The control mechanism 5 is disposed to actuate movement of the probe assembly 42 relative to the first housing 2 in the probe moving direction between a projecting position, where the tip end 425 of the probe 422 extends into the grill space 13 through the penetrating hole 223, and the retreating position. In this embodiment, the control mechanism 5 has an actuating member 51 which is mounted on and slidable relative to the housing shell 21 in a sliding direction 50 that is transverse to the probe moving direction, a plurality of fastening plates 52 which are disposed to movably fasten the actuating member 51 on the housing shell 21, and a stop member 53 which is secured to the housing shell 21 and which extends through the actuating member 51. The actuating member 51 has an actuating portion 511 which extends in the sliding direction 50, a convex portion 513 which extends from the actuating portion 511 in the sliding direction 50 and which is configured to have a chamber 517 that is aligned with and accommodates the protrusion 426 when the probe assembly 42 is in the retreating position, and a guiding portion 512 which extends from the convex portion 513 in the sliding direction 50 and opposite to the actuating portion 511 and which has a guiding slot 516. The actuating portion 511 has a press end 515 adjacent to the convex portion 513, and extends in the sliding direction 50 to terminate at an operating end 514 that projects outwardly of the housing shell 21 through the opening 211. An operating knob 54 is mounted on the operating end 514 to be manually operable. The stop member 53 is slidable in the guiding slot 516 to stop the sliding movement of the actuating member 51 so as to indicate the movement of the probe assembly 42 to a respective one of the projecting and retreating positions.

The second grill module 12 has a second grill plate 121 on which a food is placed and which faces the first grill plate 22 when the first grill module 11 is in the closed position. The second grill plate 121 has a recess 123 and a plurality of rib portions 120 that are respectively aligned with the penetrating hole 223 in the probe moving direction and the rib portions 224 of the first grill plate 22 when the first grill module 11 is in the closed position so as to permit insertion of the tip end 425 of the probe 422 in the recess 123 and to clamp and press the food. A heating member 124 is mounted below the second grill plate 121. The heating members 124, 25 and the probe 422 are electronically connected with a circuit board (not shown) such that the heating members 124, 25 can be controlled in accordance with the temperature sensed by the probe 422.

In this embodiment, the tip end 425 of the probe 422 can project from one of the rib portions 224 to be completely inserted into the food under such rib portion 224 so as to prevent a part of the probe 422 from exposure in the grill space 13. Accordingly, the temperature of the food can be sensed precisely.

In this embodiment, the heating time and temperature of the heating members 124, 25 are controlled by the circuit board in accordance with the temperature inside the food sensed by the probe 422. When the grill device 1 is in a ready-to-use state, the protrusion 426 of the probe assembly 42 is accommodated in the chamber 517 of the actuating member 51 to retreat the tip end 425 of the probe 422 in the penetrating hole 223 by means of the biasing member 43. Namely, the probe assembly 42 is kept in the retreating position. With such structure, the user is prevented from an accidental prick, such that the safety of the grill device 1 can be ensured.

When it is desired to grill a food using the grill device 1, the first and second grill plates 22, 121 are firstly preheated, and the food is placed on the second grill plate 121. Subsequently, the first grill module 11 is turned to the closed position, and the actuating member 51 is pressed to slide along the sliding direction 50. With the press end 515 and the slope 428 which facilitate conversion of the sliding movement of the actuating member 51 into a linear movement of the probe assembly 42, the probe assembly 42 is moved from the retreating position to the projecting position. The sliding movement of the actuating member 51 is stopped when the press end 515 is moved over the ridge 427. During the linear movement of the probe assembly 42, the tip end 425 of the probe 422 extends through the penetrating hole 223 and is inserted into the food. The tip end 425 may penetrate through the food if the food is relatively thin and extend toward the recess 123 of the second grill plate 121. The probe 422 can hence sense the temperature inside the food. Thereafter, the actuating member 51 is operated to return back to the original position such that the probe assembly 42 can be returned to the retreating position by means of the biasing member 43, as shown in FIG. 2, for preventing the user from being pricked.

Figure 7:
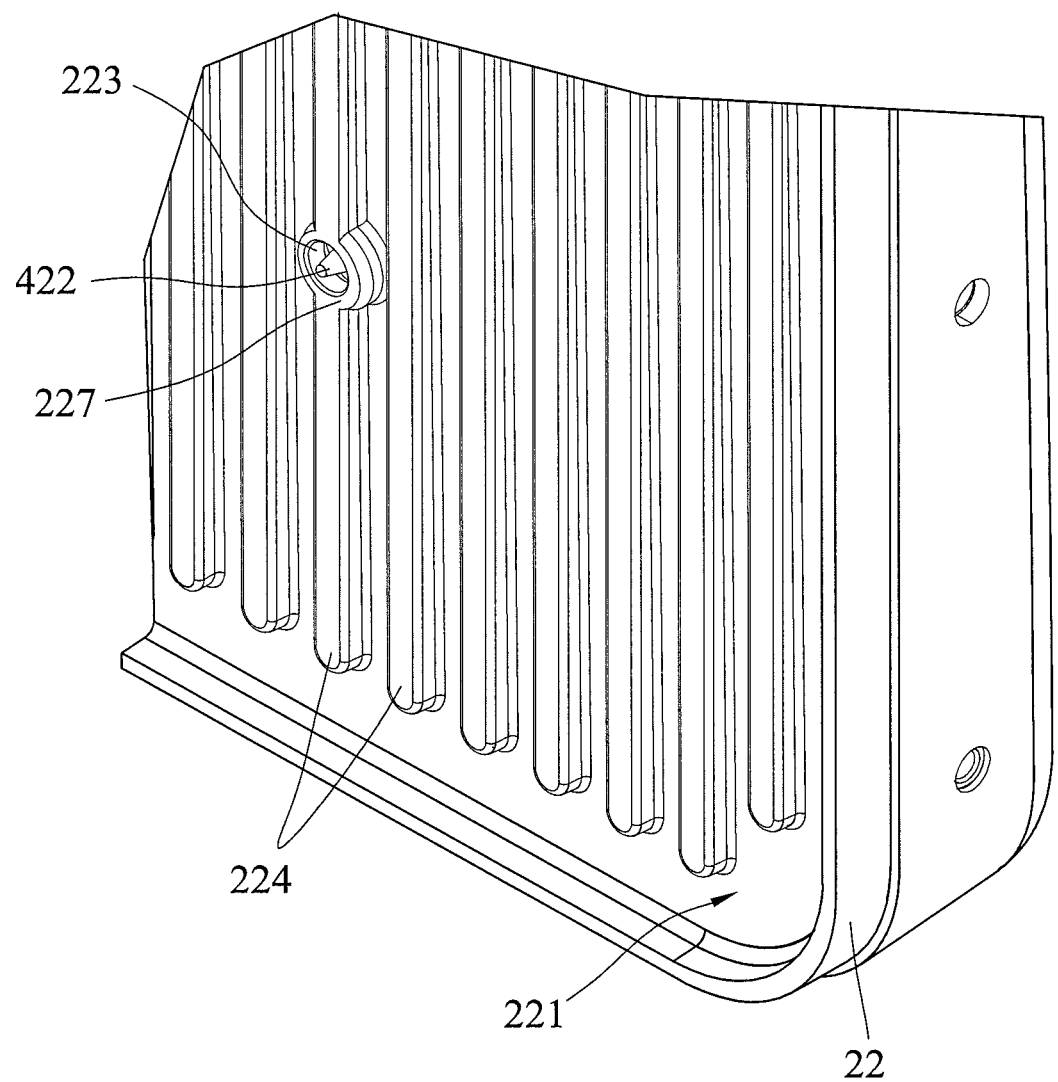
FIG. 7 is a fragmentary perspective view of a first grill plate of the grill device according to a second embodiment.

Referring to FIG. 7, in a second embodiment, the transverse section 227 of one of the rib portions 224 has a circular structure and is not connected with the adjacent rib portions 224. The penetrating hole 223 is formed in and extends through the transverse section 227.

Figure 8:
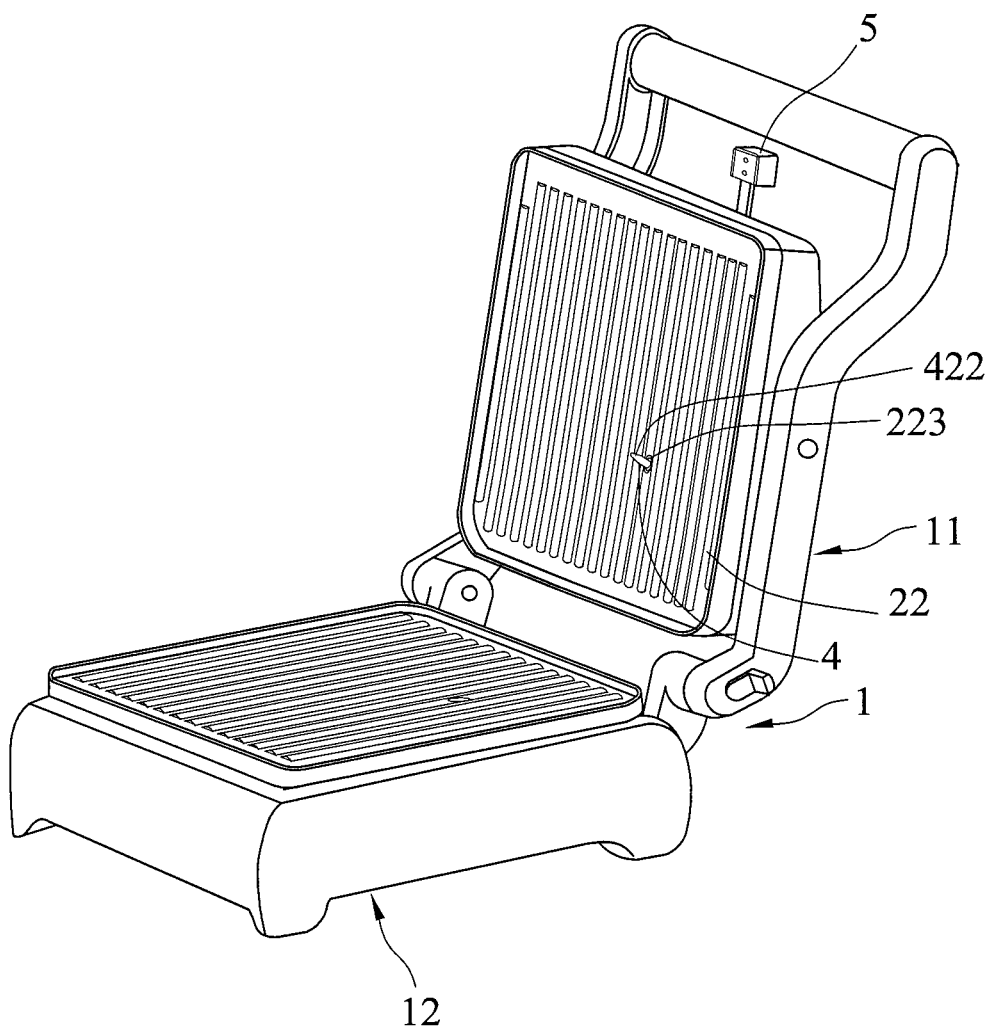
FIG. 8 is a perspective view of a third embodiment of a grill device according to the disclosure.

In one of the previous embodiments, the probe 422 is elongated in the probe moving direction that is normal to the first grill plate 22. Alternatively, referring to FIG. 8, in a third embodiment, the probe 422 is elongated in the probe moving direction that is inclined relative to the first grill plate 22.

Figure 9:
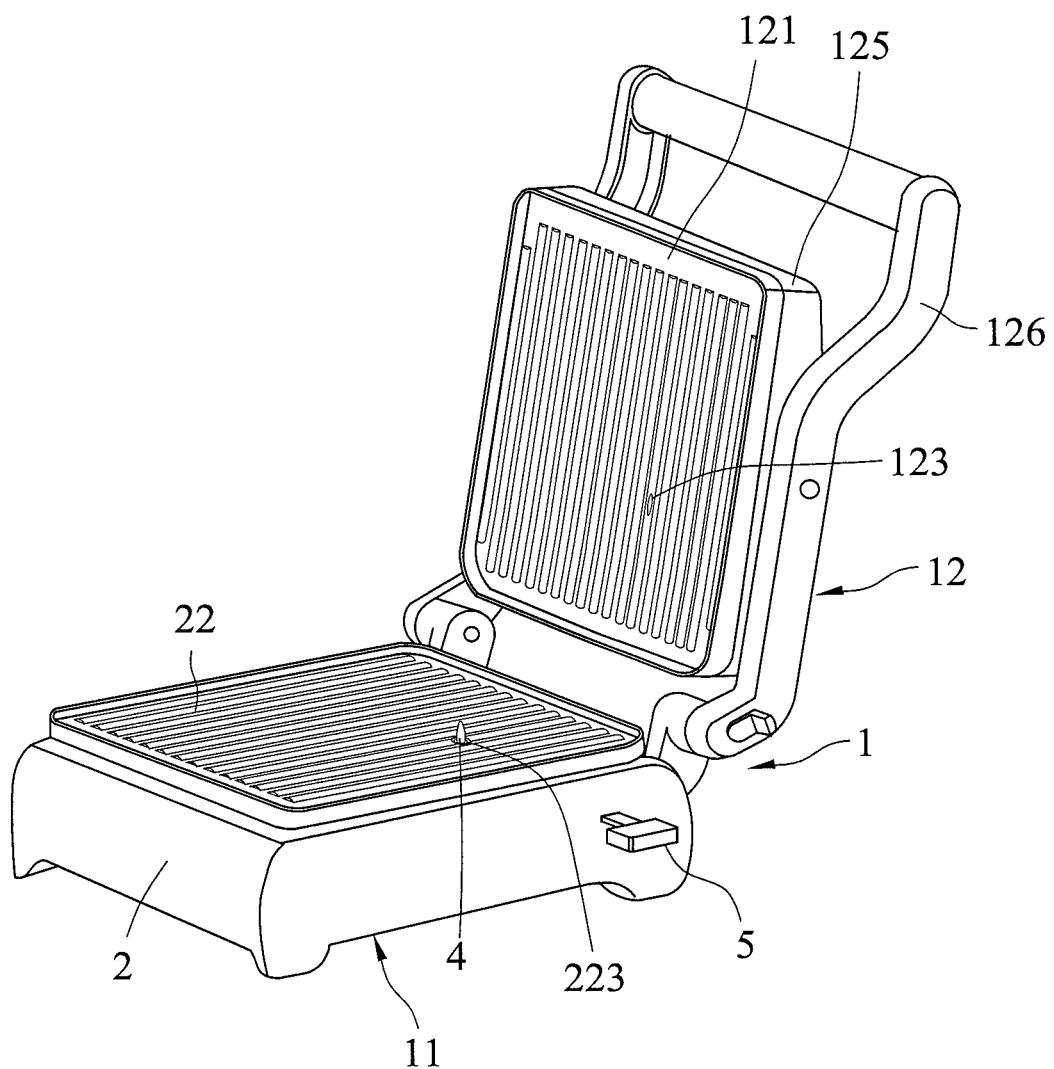
FIG. 9 is a perspective view of a fourth embodiment of a grill device according to the disclosure.

Referring to FIG. 9, in a fourth embodiment, the first grill module 11 is configured to have the first housing 2 placed on a tabletop. The second grill module 12 has a housing shell 125 which is connected to the second grill plate 121, and a handle 126 which is securely connected to the housing shell 125 and through which the housing shell 125 is pivotably mounted to the first grill module 11.

Figure 10:
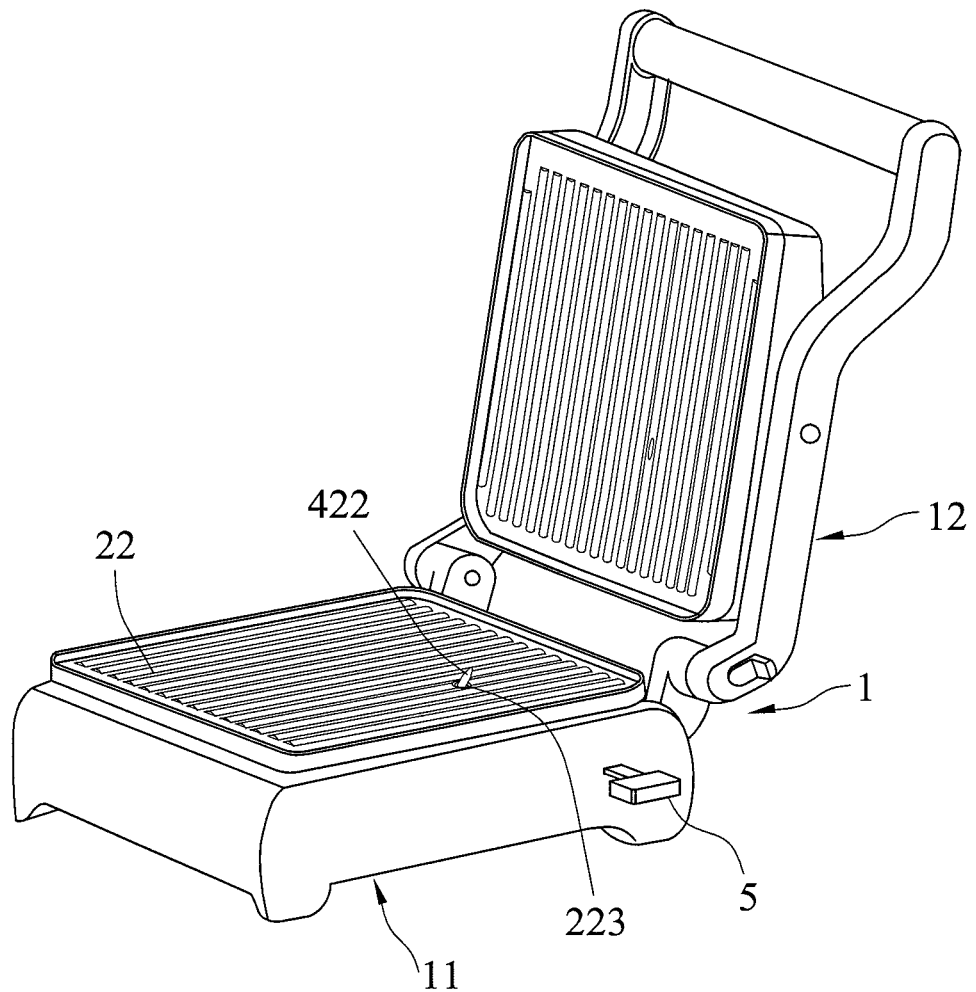
FIG. 10 is a perspective view of a fifth embodiment of a grill device according to the disclosure.

In this embodiment, the probe 422 is elongated in the probe moving direction that is normal to the first grill plate 22. Alternatively, referring to FIG. 10, in a fifth embodiment, the probe 422 is elongated in the probe moving direction that is inclined relative to the first grill plate 22.

Figure 11:
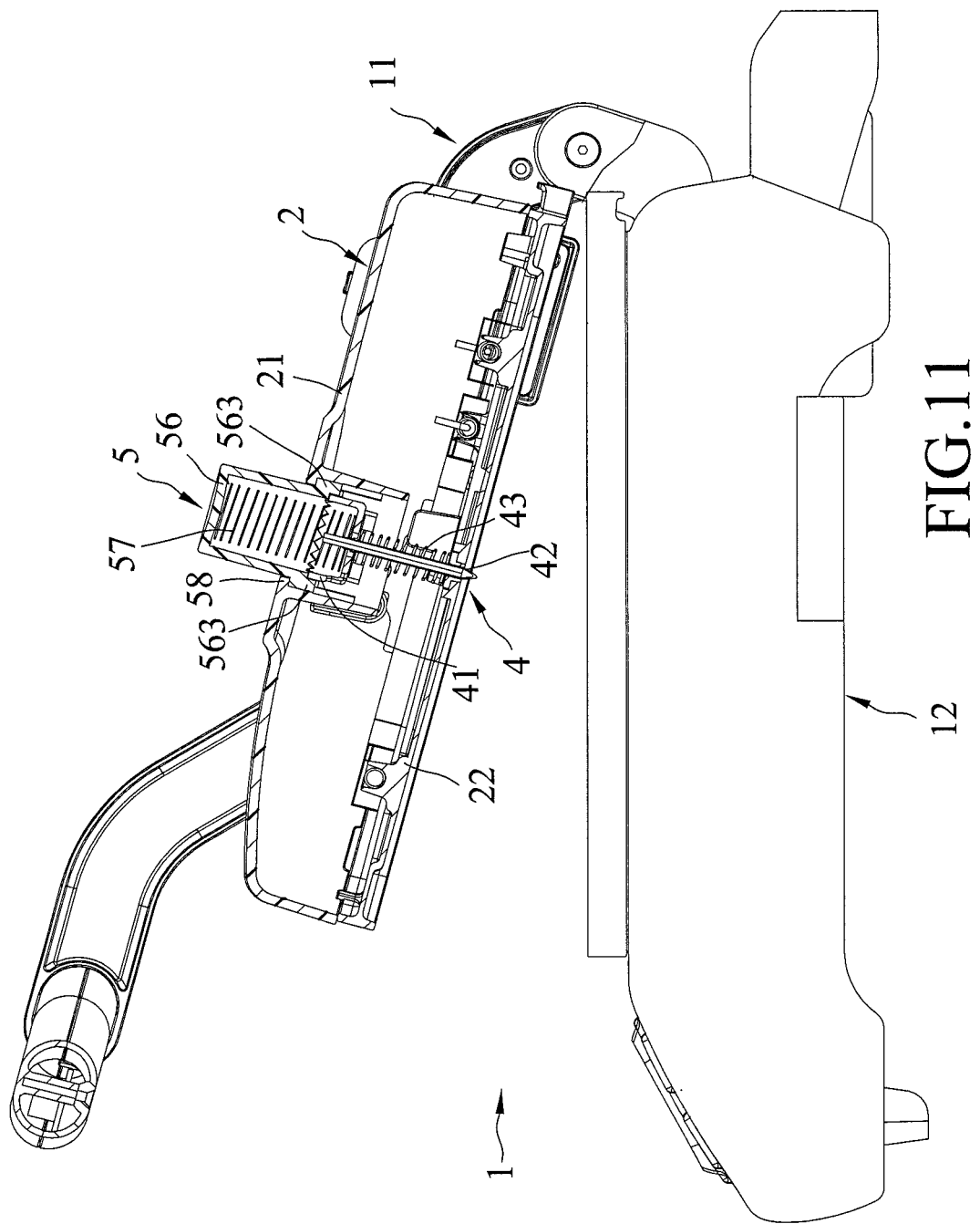
FIG. 11 is a partially sectional view of a sixth embodiment of a grill device in a state where a probe assembly is in a retreating position.
Figure 12:
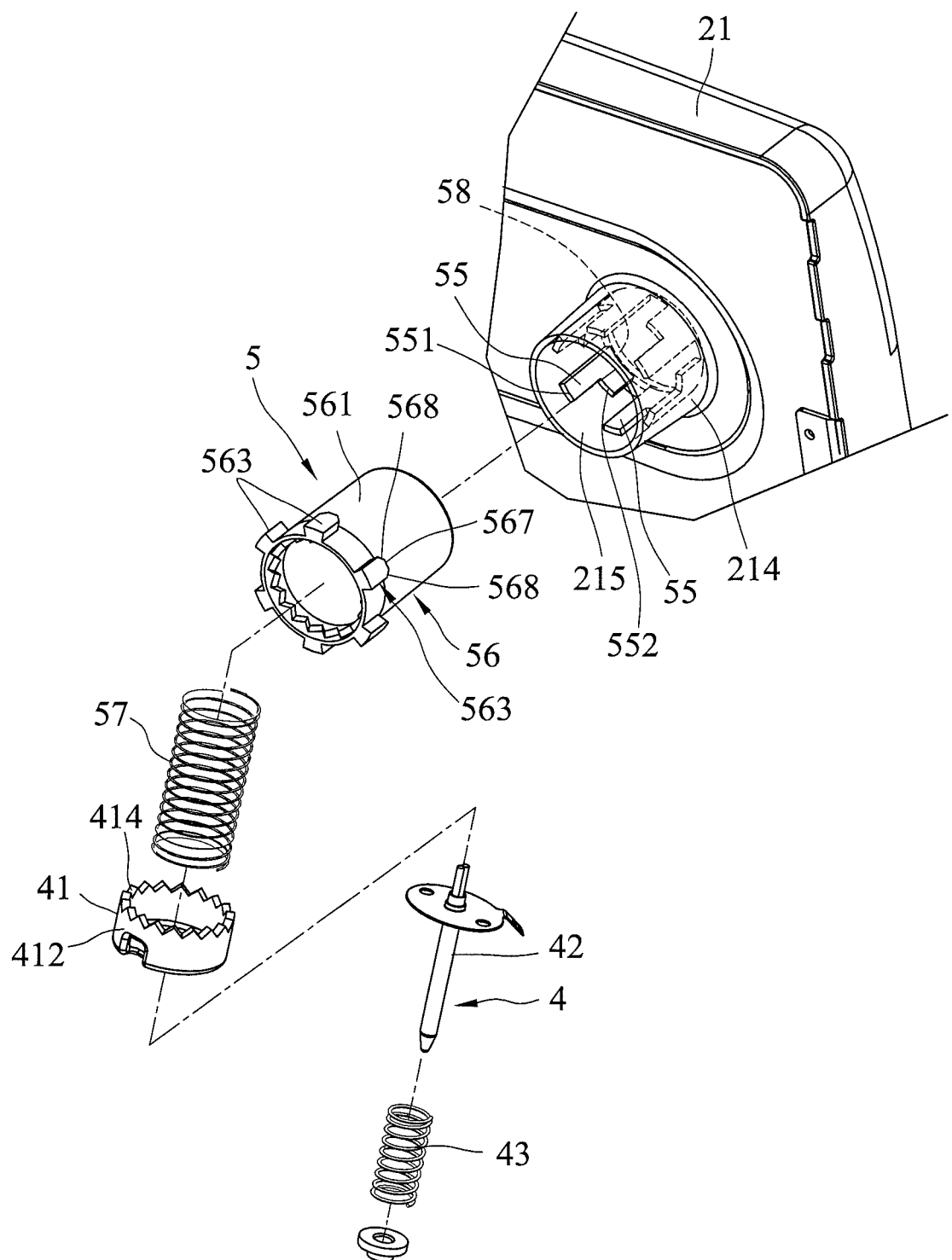
FIG. 12 is a fragmentary, exploded perspective view illustrating a sensing mechanism and a control mechanism of the grill device.
Figure 13:
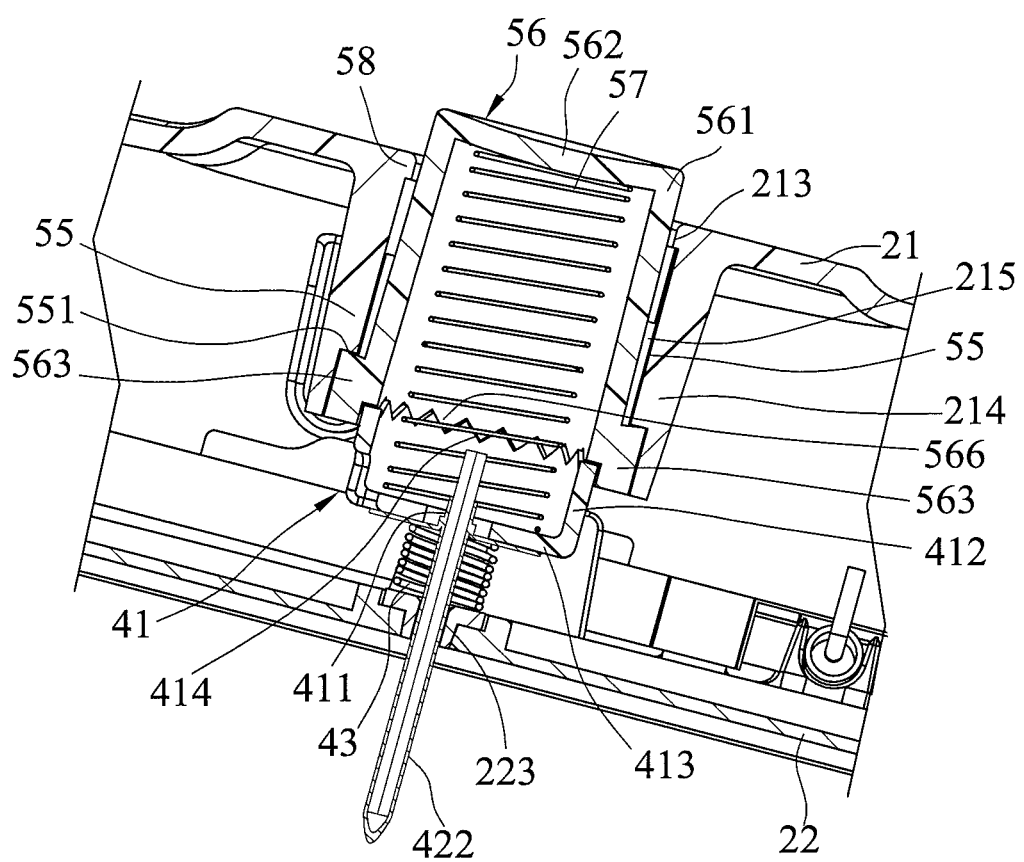
FIG. 13 is a fragmentary sectional view illustrating a state where the probe assembly is in a projecting position.

With reference to FIGS. 11 to 13, in a sixth embodiment, the housing shell 21 of the first housing 2 has a shell hole 213 which is aligned with the penetrating hole 223 in the probe moving direction, and a socket 214 which extends from the shell hole 213 toward the first grill plate 22 and which surrounds a moving axis in the probe moving direction to define a sliding channel 215 therein.

The frame 41 has an inner surrounding wall 412 which surrounds the moving axis, a first base wall 413 which is connected to the inner surrounding wall 412 and normal to the moving axis and which has a through hole 411 for passage of the probe 422 therethrough, and an annular teethed portion 414 which is disposed on the inner surrounding wall 412. The biasing member 43 is a coil spring which is sleeved around the probe 422 and which abuts against the first base wall 413 and the first grill plate 22.

The control mechanism 5 has a plurality of lower engaging members 55 which project from the socket 214 toward the sliding channel 215 and which are angularly spaced apart from each other, an annular upper engaging member 58 which projects from the socket 214 toward the sliding channel 215 and adjacent to the shell hole 213, a push button 56 which is movable in the sliding channel 215 along the moving axis, and a biasing spring 57 which is disposed between the push button 56 and the frame 41. Each lower engaging member 55 has a first engaging surface 551 and a second engaging surface 552 which is angularly displaced from the first engaging surface 551 about the moving axis and which is located between the first engaging surface 551 and the upper engaging member 58 in the probe moving direction. The push button 56 has an outer surrounding wall 561 which surrounds the inner surrounding wall 412 of the frame 41 and which is disposed to be moved with and rotatable relative to the inner surrounding wall 412, a second base wall 562 which is connected to the outer surrounding wall 561 and normal to the moving axis, a plurality of stop members 563 which project outwardly from the outer surrounding wall 561, and an annular teethed portion 566 which is disposed on the outer surrounding wall 561 and which is engaged with the annular teethed portion 414 of the frame 41 to be moved and rotated with the frame 41. Each stop member 563 has a retaining surface 567 and two chamfers 568 at opposite sides of the retaining surface 567. The biasing spring 57 is disposed within the outer surrounding wall 561 and abuts against the first and second base walls 413, 562 to bias the push button 56 away from the frame 41.

When the probe assembly 42 is in the retreating position, as shown in FIG. 11, the retaining surface 567 of each stop member 563 abuts against the upper engaging member 58. At this time, the annular teethed portions 566, 414 are engaged with each other.

When the push button 56 is pushed along the moving axis and is rotated about the moving axis, the probe assembly 42 is moved therewith toward the first grill plate 22 to the projecting position against the biasing action of the biasing member 43. Each stop member 563 is moved and rotated to abut against the first engaging surface 551 of the respective lower engaging member 55 so as to keep the probe assembly 42 in the projecting position, as shown in FIG. 13.

Figure 14:
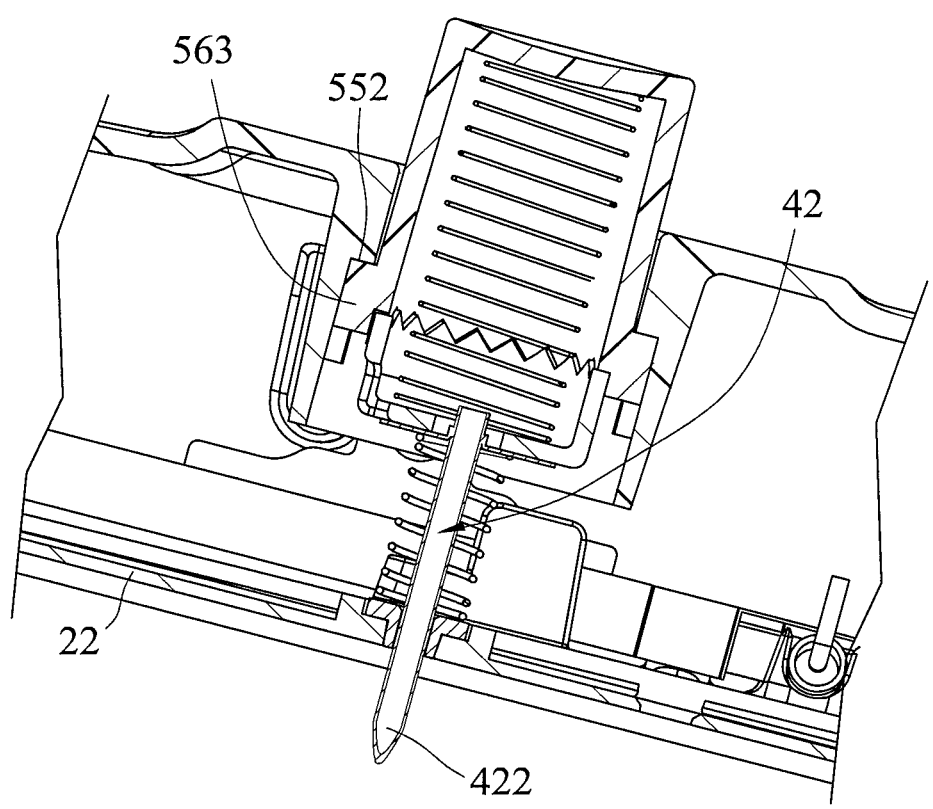
FIG. 14 is a fragmentary sectional view illustrating a state where the probe assembly is in a middle projecting position.
Figure 15:
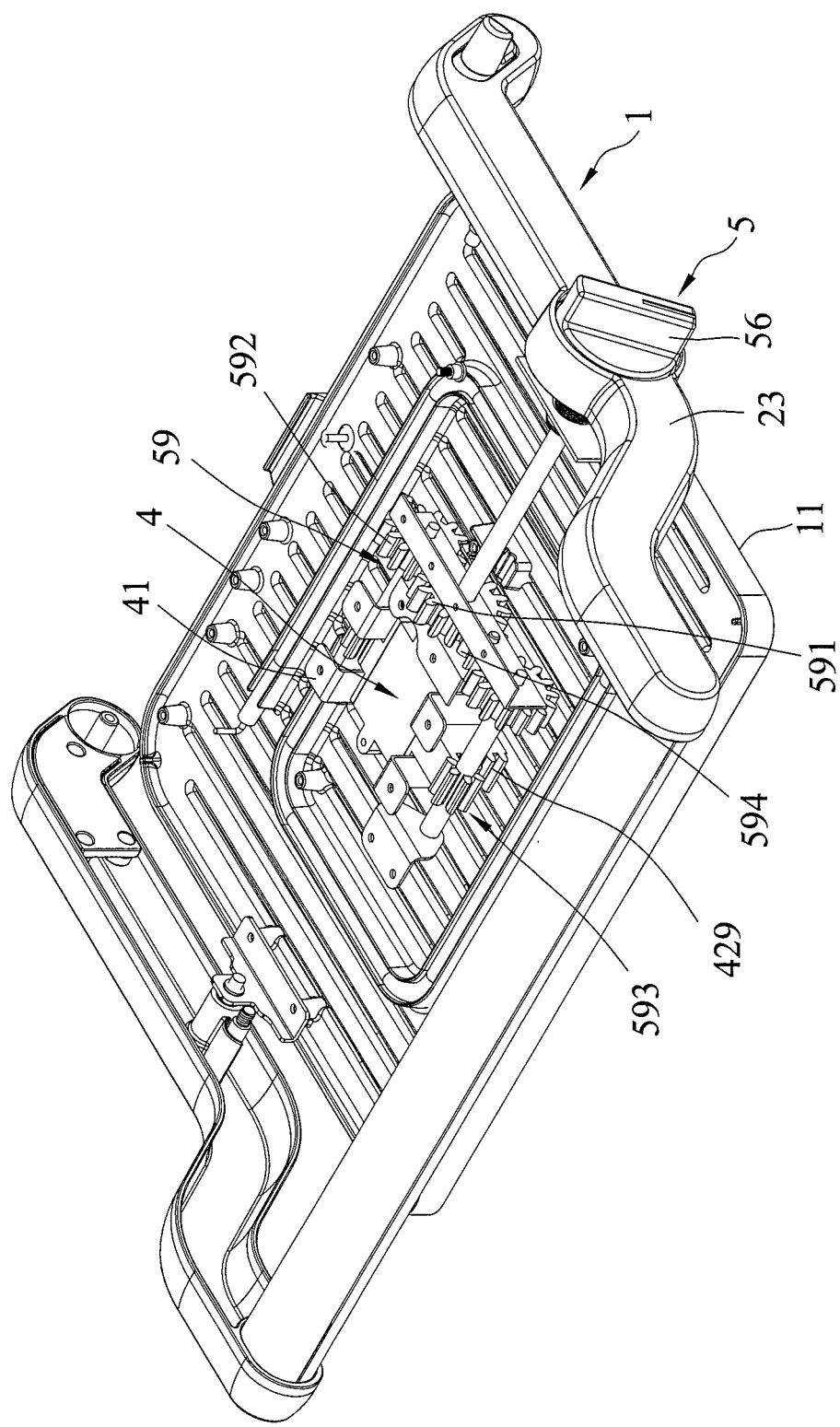
FIG. 15 is a perspective view of a seventh embodiment of a grill device according to the disclosure.
Figure 16:
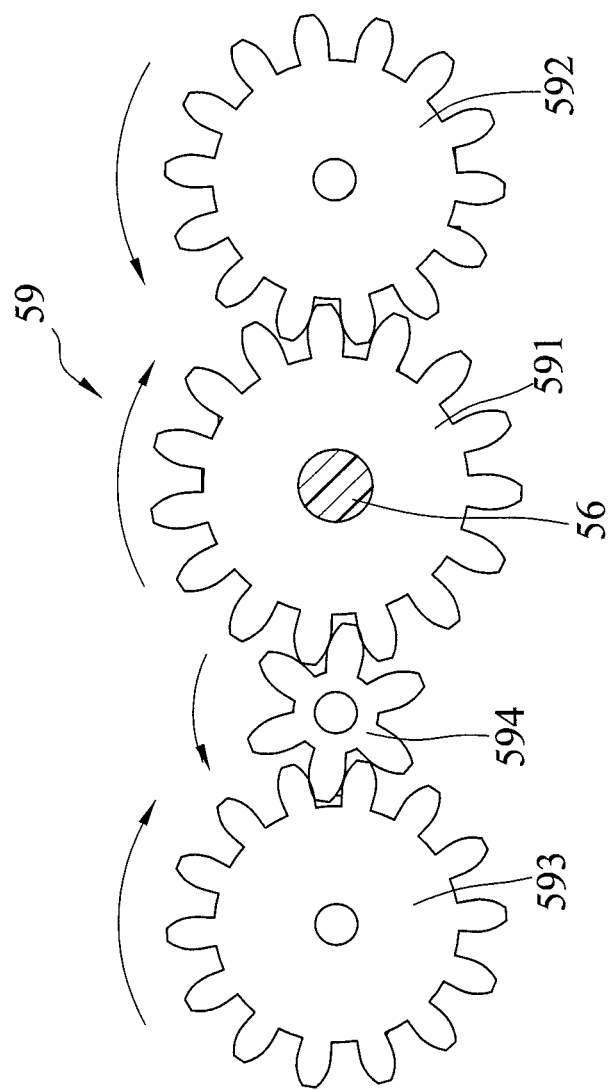
FIG. 16 is a schematic side view of a gear unit of the seventh embodiment.
Figure 17:
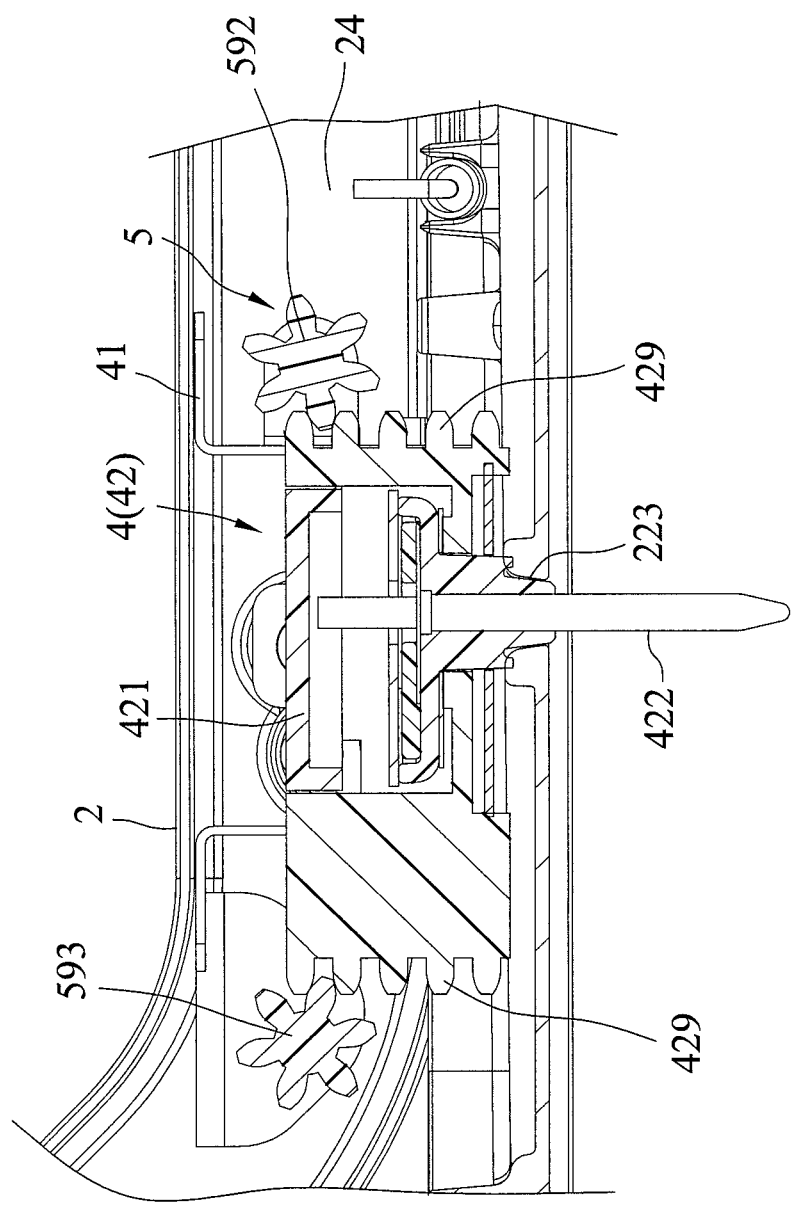
FIG. 17 is a fragmentary sectional view illustrating a state where a probe assembly is in a projecting position.
Figure 18:
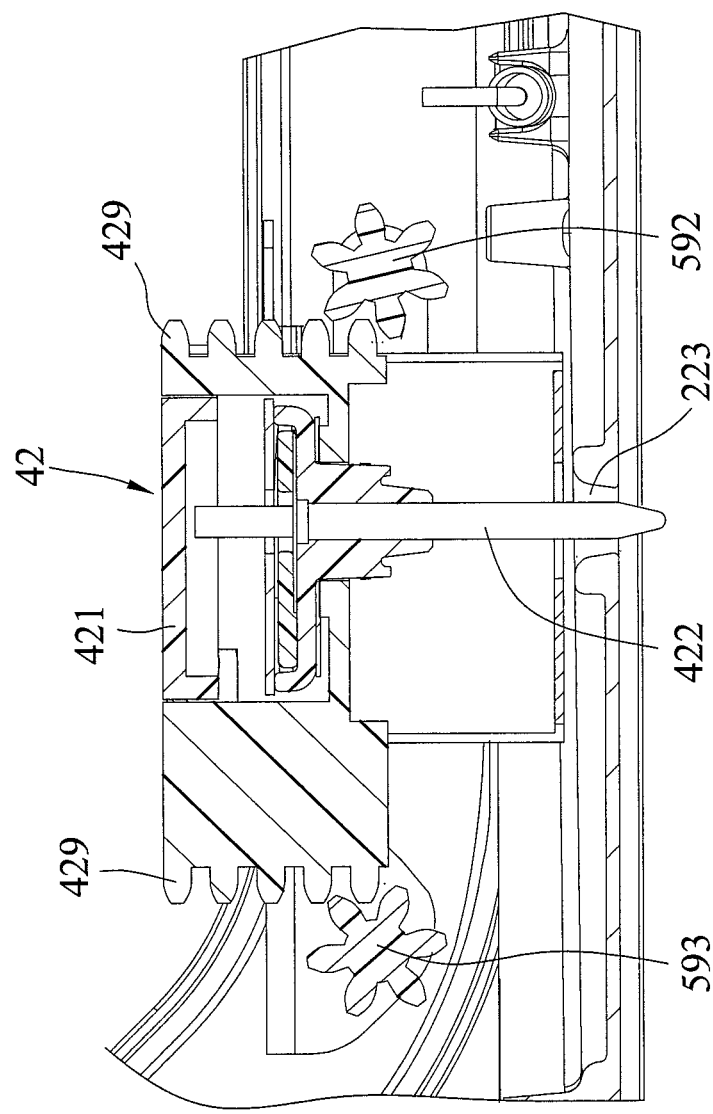
FIG. 18 is a fragmentary sectional view illustrating a state where the probe assembly is in a retreating position.

Referring to FIGS. 12 and 14, when the push button 56 is pushed and rotated again, each stop member 563 is turned to abut against the second engaging surface 552 of the respective lower engaging member 55 so as to keep the probe assembly 42 in a middle projecting position, where the projecting length of the probe 422 from the first grill plate 22 is shorter than that in the projecting position. Therefore, the projecting length of the probe 422 is adjustable as required in this embodiment.

Through push and rotation of the push button 56, the probe assembly 42 is movable between the retreating and projecting positions. The probe 422 can be disposed to elongate normal to the first grill plate 22 or to be inclined relative to the first grill plate 22. Additionally, the control mechanism 5 may have only one lower engaging member 55 and one stop member 563.

Referring to FIGS. 15 to 18, in a seventh embodiment, the probe housing 421 has two racks 429 which are disposed opposite to each other in a transverse direction that is transverse to the probe moving direction and which extend in the probe moving direction.

The control mechanism 5 has a gear unit 59 which is disposed to drive movement of the probe housing 421 and the probe 422 in the probe moving direction, and an operating member 56 which is mounted on the first housing 2 and which extends in a gear axis transverse to both the probe moving direction and the transverse direction to terminate at an operated knob that is disposed laterally of the handle 23 to be manually operable. The gear unit 59 has a primary gear 591 which is connected to the operating member 56 to be actuated to rotate about the gear axis, a first connecting gear 592 which meshes with the primary gear 591 and one of the racks 429, a second connecting gear 593 which meshes with the other one of the racks 429, and a reverse gear 594 which meshes with the second connecting gear 593 and the primary gear 591 to make a reverse rotation relative to the primary gear 591 so as to rotate the second connecting gear 593 in a same rotational direction as that of the primary gear 591 for making a synchronous movement of the racks 429 in the probe moving direction. With rotation of the operating member 56, rotation of the primary gear 591 can be converted into movement of the racks 429 in the probe moving direction so as to move the probe assembly 42 between the retreating and projecting positions.

As illustrated, the probe 422 of the grill device 1 according to this disclosure can be retreated in the penetrating hole 223 so as to prevent the user from being pricked when the user opens the first grill module 11. Thus, safety for use can be ensured. With the control mechanism 5, the probe 422 can be moved to project from or retreat in the penetrating hole 223 during use.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A grill device comprising:
a first grill module including a first housing which has a first grill plate and a housing shell that is connected to said first grill plate, and a sensing mechanism which is mounted on said first housing, said first grill plate having a penetrating hole; and
a second grill module movably connected to said first grill module such that said first grill module is movable between a closed position, where said first grill module is overlapped with said second grill module to define a grill space therebetween for accommodating a food to be grilled and said first grill plate faces said grill space, and an opened position;
said sensing mechanism having a probe assembly which is movably mounted on said first housing and which has a probe and a probe housing for receiving said probe therein;
said first grill module further including a control mechanism which is disposed to actuate movement of said probe assembly relative to said first housing in a probe moving direction between a projecting position, where a tip end of said probe extends into said grill space through said penetrating hole, and a retreating position, where said tip end of said probe retreats into said penetrating hole;
said sensing mechanism having a biasing member disposed to bias said probe assembly to the retreating position;
said control mechanism having an actuating member which is mounted on and movable relative to said housing shell in a sliding direction that is transverse to the probe moving direction to actuate the movement of said probe assembly from the retreating position to the projecting position.

2. The grill device as claimed in claim 1, wherein said probe housing has a plurality of lugs, said housing shell having a plurality of spring holders that are aligned with said lugs, respectively, in the probe moving direction, said biasing member having a plurality of springs each of which is disposed between a respective one of said lugs and a respective one of said spring holders.

3. The grill device as claimed in claim 1, wherein said probe housing has a protrusion which projects in the probe moving direction, said actuating member having an actuating portion which extends in the sliding direction, and a convex portion which extends from said actuating portion in the sliding direction and which is configured to align with and accommodate said protrusion when said probe assembly is in the retreating position such that, in response to a sliding movement of said actuating portion in the sliding direction, said protrusion is pressed by said actuating portion to permit the movement of said probe assembly to the projecting position.

4. The grill device as claimed in claim 3, wherein said actuating member has a guiding portion which extends from said convex portion in the sliding direction and opposite to said actuating portion, and which has a guiding slot, said control mechanism having a stop member which is secured to said housing shell and which is slidable in said guiding slot to stop the sliding movement of said actuating member so as to indicate the movement of said probe assembly to a respective one of the projecting and retreating positions.

5. The grill device as claimed in claim 4, wherein said actuating portion has a press end adjacent to said convex portion, said protrusion having a ridge and a slope which is inclined from said ridge toward said press end when said probe assembly is in the retreating position so as to facilitate conversion of the sliding movement of said actuating member into the movement of said probe assembly.

6. The grill device as claimed in claim 1, wherein said second grill module has a second grill plate which faces said first grill plate when said first grill module is in the closed position, and which has a recess that is aligned with said penetrating hole in the probe moving direction when said first grill module is in the closed position so as to permit insertion of said tip end of said probe therein.

7. The grill device as claimed in claim 1, wherein said first grill plate has a first grill surface facing said grill space and an inner surface opposite to said grill surface, said first grill surface having a base surface portion and a plurality of rib portions which are spaced apart from each other and which extend from said base surface portion, said penetrating hole being formed in and extending through one of said rib portions.

8. The grill device as claimed in claim 1, wherein said probe is elongated in the probe moving direction that is normal to said first grill plate.

9. The grill device as claimed in claim 1, wherein said probe is elongated in the probe moving direction that is inclined relative to said first grill plate.

* * * * *